(12) United States Patent
Peng et al.

(10) Patent No.: US 12,182,009 B2
(45) Date of Patent: Dec. 31, 2024

(54) METHOD, ELECTRONIC DEVICE, AND STORAGE MEDIUM FOR LOCATING FAULT INFORMATION

(71) Applicant: BEIJING BAIDU NETCOM SCIENCE TECHNOLOGY CO., LTD., Beijing (CN)

(72) Inventors: Yang Peng, Beijing (CN); Lei Feng, Beijing (CN); Zhenxing Cao, Beijing (CN); Weida Liao, Beijing (CN); Huanan Lu, Beijing (CN); Yuzhen Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 57 days.

(21) Appl. No.: 17/992,720

(22) Filed: Nov. 22, 2022

(65) Prior Publication Data
US 2023/0079222 A1    Mar. 16, 2023

(30) Foreign Application Priority Data

Jan. 17, 2022    (CN) .......................... 202210050183.2

(51) Int. Cl.
G06F 11/00    (2006.01)
G06F 11/36    (2006.01)

(52) U.S. Cl.
CPC ...... *G06F 11/3692* (2013.01); *G06F 11/3664* (2013.01)

(58) Field of Classification Search
CPC ............... G06F 11/3692; G06F 11/366; G06F 11/0775; G06F 11/0781
See application file for complete search history.

(56) References Cited

U.S. PATENT DOCUMENTS

| | | | |
|---|---|---|---|
| 6,345,322 B1 * | 2/2002 | Humphrey | G06F 11/3636 714/36 |
| 8,448,141 B2 * | 5/2013 | Blount | G06F 8/70 717/124 |
| 9,104,797 B1 | 8/2015 | Sekhar et al. | |
| 9,575,830 B2 * | 2/2017 | Chen | G06F 11/0778 |

(Continued)

FOREIGN PATENT DOCUMENTS

| | | |
|---|---|---|
| CN | 107092554 A | 8/2017 |
| CN | 108089977 A | 5/2018 |

(Continued)

OTHER PUBLICATIONS

"Analysis on Alipay App Build Optimization: Extreme Compression for sized of Android packages," Aliyun.com (available at: https://developer.aliyun.com/article/680527) (Dec. 18, 2018).

*Primary Examiner* — Amine Riad

(74) *Attorney, Agent, or Firm* — Leydig, Voit & Mayer, Ltd.

(57) ABSTRACT

A method for locating a fault information is provided. The method includes: parsing error information of a target application to obtain version information and an error attribute of the target application; determining, based on the version information, a target mapping file corresponding to the error information; and determining a target location by utilizing the error attribute and the target mapping file, where the target location is used to determine a location of fault description content.

15 Claims, 4 Drawing Sheets

(56) References Cited

U.S. PATENT DOCUMENTS

| | | | |
|---|---|---|---|
| 11,630,716 B2* | 4/2023 | Kingsley | G06F 11/327 |
| | | | 714/57 |
| 11,740,955 B2* | 8/2023 | Sun | G06F 11/0778 |
| | | | 714/37 |
| 2007/0168969 A1 | 7/2007 | Prakash | |
| 2011/0246964 A1 | 10/2011 | Cox et al. | |
| 2016/0246703 A1 | 8/2016 | Bank et al. | |
| 2016/0306612 A1 | 10/2016 | Hewitt et al. | |
| 2017/0103013 A1* | 4/2017 | Grechanik | G06N 5/025 |
| 2021/0303380 A1* | 9/2021 | Sun | G06F 16/245 |

FOREIGN PATENT DOCUMENTS

| | | |
|---|---|---|
| CN | 110928779 A | 3/2020 |
| CN | 111090582 A | 5/2020 |
| CN | 111708680 A | 9/2020 |
| CN | 112527546 A | 3/2021 |
| JP | 201288792 A | 5/2012 |
| WO | 2021232729 A1 | 11/2021 |

* cited by examiner

METHOD, ELECTRONIC DEVICE, AND STORAGE MEDIUM FOR LOCATING FAULT INFORMATION

CROSS-REFERENCE TO RELATED APPLICATIONS

The present application claims priority to Chinese patent application No. 202210050183.2, filed on Jan. 17, 2022, the entire contents of which are hereby incorporated by reference in their entirety for all purposes.

TECHNICAL FIELD

The present disclosure relates to the field of computer technologies, and in particular, to the technical fields of information flow, intelligent search, and the like.

BACKGROUND

With the continuous development of Internet technologies, the number of applications used by users and the usage frequency of the applications are constantly increasing. In this context, it is particularly important for manufacturers to efficiently respond to application exceptions. The original exception analysis method cannot meet the requirements of business development due to its low time effectiveness. In the meantime, with the continuous expansion of application functions, sizes of application packages continue to increase, resulting in poor user experience. Therefore, how to reduce the size of the application package and improve the time effectiveness of application fault information analysis has become a technical problem that needs to be solved.

SUMMARY

The present disclosure provides a method for locating fault information, an electronic device, and a storage medium.

According to an aspect of the present disclosure, a method for locating fault information is provided, where the method may include the following steps: parsing error information of a target application to obtain version information of the target application and an error attribute of the target application; determining, based on the version information, a target mapping file corresponding to the error information; and determining a target location by utilizing the error attribute and the target mapping file, where the target location is used to determine a location of fault description content.

According to another aspect of the present disclosure, there is provided an electronic device, including: one or more processors; a memory storing one or more programs configured to be executed by the one or more processors, the one or more programs including instructions for performing the method according to any one of the embodiments of the present disclosure.

According to another aspect of the present disclosure, there is provided a non-transitory computer-readable storage medium storing one or more programs, the one or more programs comprising instructions, which when executed by one or more processors of an electronic device, cause the electronic device to perform the method according to any one of the embodiments of the present disclosure.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the solutions, and do not constitute a limitation on the present disclosure. In the accompanying drawings.

DETAILED DESCRIPTION

Example embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described herein, without departing from the scope and spirit of the present disclosure. Likewise, for clarity and conciseness, the description of well-known functions and structures is omitted in the following description.

Figure 1:
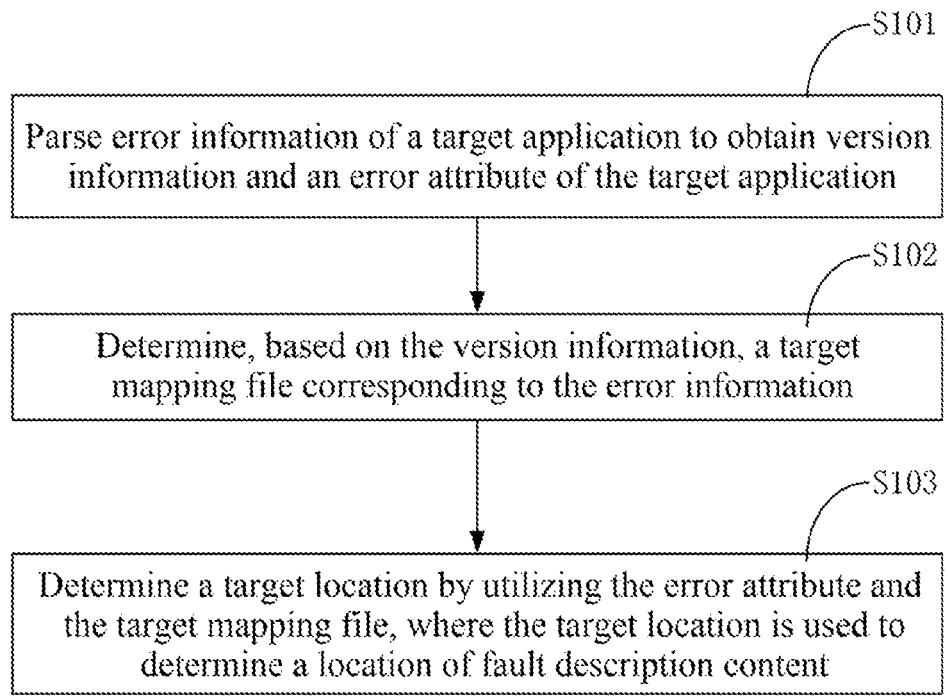
FIG. 1 is a flowchart of a method for locating fault information according to an embodiment of the present disclosure.

As shown in FIG. 1, the present disclosure relates to a method for locating fault information, where the method may include the following steps:

S101: parsing error information of a target application to obtain version information and an error attribute of the target application;

S102: determining, based on the version information, a target mapping file corresponding to the error information; and S103: determining a target location by utilizing the error attribute and the target mapping file, where the target location is used to determine a location of fault description content.

This embodiment may be applied to a server, and may be specifically a distributed real-time stream processing system, such as SparkStreaming, Flink, SC, Storm, or the like, which is not limited herein.

The target application may be any application installed on a client, and may be specifically various applications developed by different manufacturers.

The error information is information reported after an exception occurs during running of the application, and may be anomaly information related to the target application that is sent by the client and received by the server. For example, the error information may be anomaly information of a related application that is generated when application crashes or lags happen and sent from the client to the server.

The error information of the target application is parsed to obtain the version information and the error attribute of the target application. The version information may be a version number of the target application, such as V1.0 or V2.0. The error attribute is used to indicate a location of a parsing result in the target application, such as an index interval to which the parsing result belongs, or a line number of the parsing result in an instruction set of the target application, which is not limited herein.

The target mapping file corresponding to the error information is determined based on the version information. The target mapping file includes the program name, version information, error type, and a correspondence between an instruction set line number and a source file line number of the target application. Applications with different version information correspond to different mapping files.

Mapping files of different applications may be stored on the server. Specifically, the mapping files may be stored in multilevel memories of the distributed real-time stream processing system on the server. The multilevel memories may include at least one of a local memory, a remote memory, or a disk, which is not limited herein.

The target location is determined by utilizing the error attribute and the target mapping file. The target location is used to determine the location of the fault description content. Specifically, the location of the fault description content may be the line number of source code of fault information in the target application or the line number of the content descripting fault information, which is not limited herein.

Through the above process, a mapping file in an application package may be provided on a server to reduce space occupied by the application package.

Figure 2:
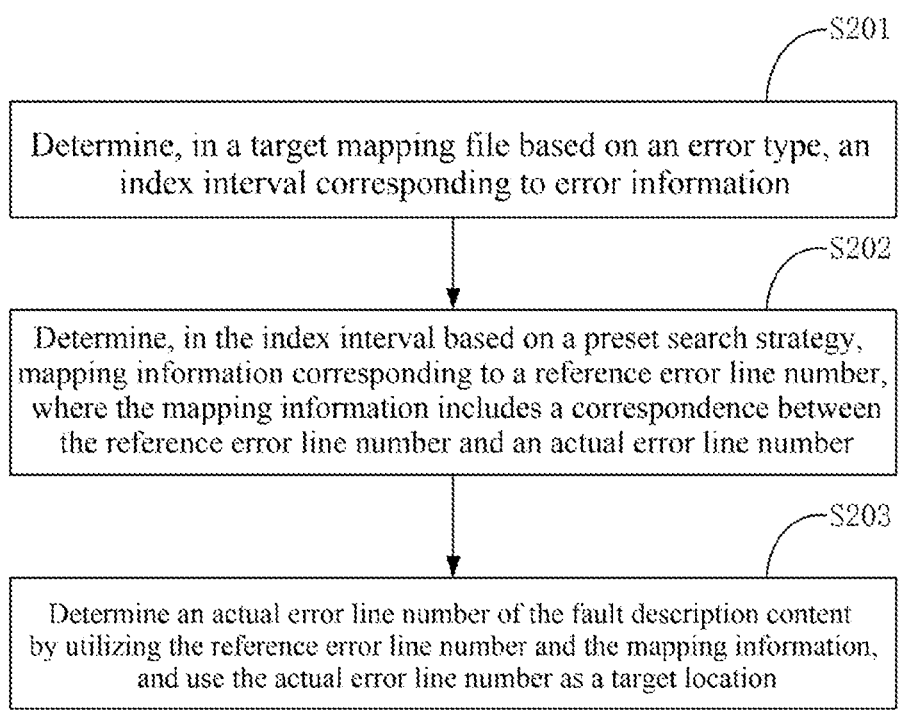
FIG. 2 is a flowchart of a method for determining a target location according to an embodiment of the present disclosure.

As shown in FIG. 2, in an implementation, when the error attribute includes an error type and a reference error line number, the determining a target location by utilizing the error attribute and the target mapping file includes:

S201: determining, in the target mapping file based on the error type, an index interval corresponding to the error information;

S202: determining, in the index interval based on a preset search strategy, mapping information corresponding to the reference error line number, wherein the mapping information includes a correspondence between the reference error line number and an actual error line number; and S203: determining an actual error line number of the fault description content by utilizing the reference error line number and the mapping information, and using the actual error line number as the target location.

The error attribute includes the error type and the reference error line number. The error type may include an error cause type and an error service type. For example, the error cause type may be a crash, a lag, or the like, which is not limited herein. The error service type may be a live streaming error, a search error, or the like, which is not limited herein.

The reference error line number may be a line number, for example, 20, 30, 40, or the like, in document code of the instruction set of the target application, which is not exhaustive herein.

The index interval corresponding to the error information is determined in the target mapping file based on the error type. The target mapping file may have a block structure, and different error types correspond to different index intervals. The index interval may be a line number interval, for example, 1001 to 2000, 2001-3000, or the like, which is not exhaustive herein. For example, in a target mapping file corresponding to the version information of V1.0 of the target application, an index interval corresponding to the error information indicating a crash type is 1001-2000, and an index interval corresponding to the error information indicating a lag type is 2001-3000. Line number values in the index interval may be set as required, which is not limited herein.

The mapping information corresponding to the reference error line number may be further found based on a preset search strategy after the index interval is determined. The mapping information may be a direct correspondence or an indirect correspondence between the reference error line number and an actual error line number.

When the mapping information is a direct correspondence between the reference error line number and an actual error line number, the actual error line number is directly obtained by utilizing the reference error line number and a direct correspondence. For example, "1024→20" may indicate that an actual error line number, in a source file, that corresponds to the reference error line number 1024 is 20; and "1085→30" may indicate that an actual error line number, in the source file, that corresponds to the reference error line number 1085 is 30.

When the mapping information is an indirect correspondence between the reference error line number and an actual error line number, a sub-index interval is first determined based on the preset search strategy and the reference error line number, and the actual error line number is then determined by utilizing a corresponding mapping relationship of the sub-index interval.

The sub-index interval may be a line number interval including a plurality of reference error line numbers, and the plurality of reference error line numbers may be reference error line numbers corresponding to the same error information sent from devices of different models. For example, in the index interval corresponding to 1001-2000, the sub-index interval may be 1001-1050,1051-1100, 1101-1150, or the like, which is not exhaustive herein.

In this case, an example of the mapping information is as follows:

1000-1050→20
1051-1100→30

In the case of the same error information, the reference error line number of a mobile phone of brand A is 1002, and the reference error line number of a mobile phone of brand B is 1024. The reference error line numbers of different mobile phones are different, but they are located in the same sub-index interval 1001-1050. Based on the sub-index interval, the same actual line number of the error information may be located in the source code.

The actual error line number of the fault description content is determined by utilizing the reference error line number and the mapping information, and the actual error line number is used as the target location.

In an implementation, the preset search strategy includes a traversal search strategy or a binary search strategy.

Through the above process, locating efficiency of the error information may be improved, and in the case where the application package is stored on the server, higher time effectiveness of analysis of the error information may still be ensured.

In an implementation, the determining, based on the version information, a target mapping file corresponding to the error information includes: based on the version information, determining the target mapping file in a local memory or a remote memory. A difference between the local memory and the remote memory lies in their different storage locations. For example, a storage location of the local memory is on a local computer, and a storage location of the remote memory is on another server. The local memory returns data faster, but the storage space of the local memory is smaller, for example, 16 GB, 32 GB, or the like, which is not limited herein. The remote memory returns data slower, but the storage space of the remote memory is larger, for example, 1 TB, 2 TB, or the like, which is not limited herein.

In an implementation, the local memory is determined as having a first priority, and the target mapping file is determined in the local memory.

In an implementation, when the target mapping file does not exist in the local memory, the target mapping file is determined in the remote memory. Before the target application is released, all target mapping files need to be pre-uploaded to the remote memory. In other words, the remote memory covers all the mapping files. If the target mapping file does not exist in the local memory, a mapping file query request is sent to the remote memory and corresponding data is returned from the remote memory.

Figure 3:
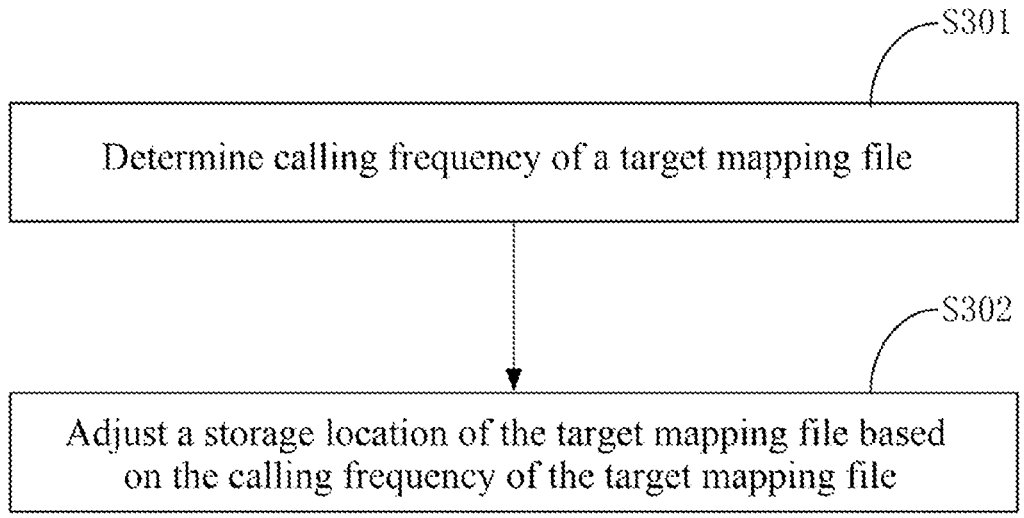
FIG. 3 is a schematic diagram of a storage location adjustment method according to an embodiment of the present disclosure.

As shown in FIG. 3, in an implementation, the method further includes:
S301: determining frequency for calling of the target mapping file; and
S302: adjusting a storage location of the target mapping file based on the frequency for calling of the target mapping file.

The frequency for calling of the target mapping file may be the frequency corresponding to the query request. For example, frequency for calling of a target mapping file of a product A application of V2.0 may be 1 time/month, 5 times/month, or the like, which is not exhaustive herein.

The adjusting the storage location of the target mapping file based on the frequency for calling of the target mapping file may be adjustment based on a relationship between the frequency for calling and a preset threshold. For example, for the target mapping file stored in the local memory, if its frequency for calling is lower than a first preset threshold, it is deleted from the local memory. For the target mapping file stored in the remote memory instead of the local memory, if its frequency for calling is higher than a second preset threshold, it is added from the remote memory to the local memory. The first preset threshold and the second preset threshold may be set as required, for example, 3 times/month, 10 times/month, or the like, which is not exhaustive herein.

Through the above process, real-time stream and the multilevel cache system are combined, so that a high cache hit rate of operator memory is implemented, ensuring that the time effectiveness of parsing a single piece of data is at the millisecond level, and satisfying the symbolic processing of millions and tens of millions of exception stacks' level.

In an implementation, the error information of the target application is obtained from message-oriented middleware, and error information reported by a plurality of user terminals are stored in the message-oriented middleware. The message-oriented middleware may be a transit disk. When the error information is reported in the peak period, the error information from different clients may be stored on the disk of the message-oriented middleware in order. Each piece of error information corresponds to a unique identifier. Based on the unique identifier, the corresponding error information is ensured to be stored or consumed only once. After the peak period ends, the processing engine sequentially processes the error information accumulated in the message-oriented middleware.

Through the above process, better pressure control can be ensured during the peak period of error reporting. In addition, based on the unique identifier corresponding to the error information, the processing of the error information may be ensured to be idempotent, that is, exactly-once semantics of the error information may be ensured.

Figure 4:
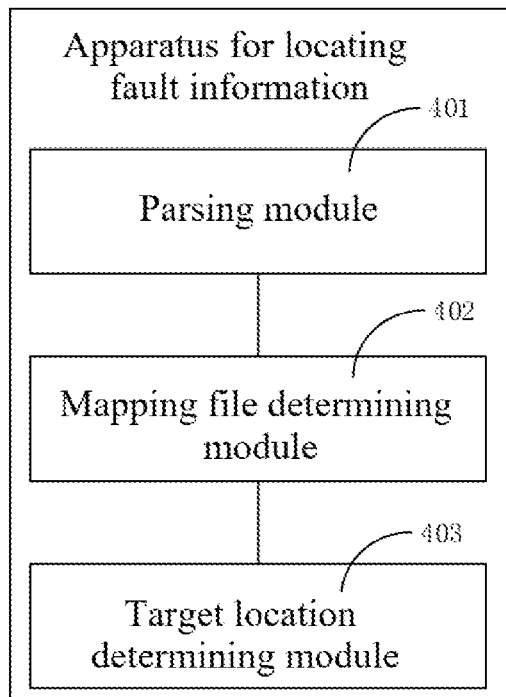
FIG. 4 is a structural diagram of an apparatus for locating fault information according to an embodiment of the present disclosure.

As shown in FIG. 4, the present disclosure relates to a apparatus for locating fault information, where the apparatus may include:
a parsing module 401 configured to parse error information of a target application to obtain version information and an error attribute of the target application;
a mapping file determining module 402 configured to determine, based on the version information, a target mapping file corresponding to the error information; and
a target location determining module 403 configured to determine a target location by utilizing the error attribute and the target mapping file, where the target location is used to determine a location of fault description content.

Figure 5:
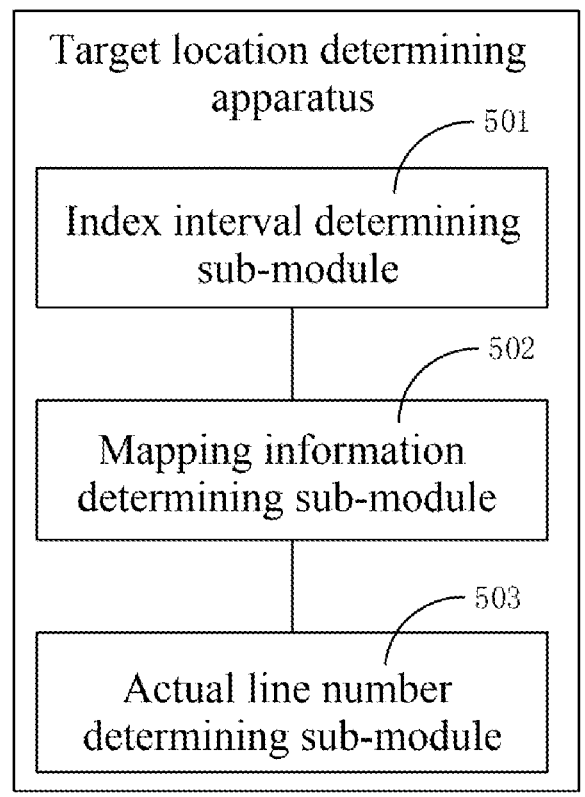
FIG. 5 is a structural diagram of a target location determining apparatus according to an embodiment of the present disclosure.

As shown in FIG. 5, in an implementation, when the error attribute includes an error type and a reference error line number, the target location determining module includes:
an index interval determining sub-module 501 configured to determine, in the target mapping file based on the error type, an index interval corresponding to the error information;
a mapping information determining sub-module 502 configured to determine, in the index interval based on a preset search strategy, mapping information corresponding to the reference error line number, where the mapping information includes a correspondence between the reference error line number and an actual error line number; and
an actual line number determining sub-module 503 configured to determine an actual error line number of the fault description content by utilizing the reference error line number and the mapping information, and use the actual error line number as the target location.

In an implementation, the preset search strategy includes a traversal search strategy or a binary search strategy.

In an implementation, the mapping file determining module is configured to: based on the version information, determine the target mapping file in a local memory or a remote memory.

In an implementation, the mapping file determining module is further configured to:
determine the local memory as having a first priority, and determine the target mapping file in the local memory.

In an implementation, the mapping file determining module is further configured to:
when the target mapping file does not exist in the local memory, determine the target mapping file in the remote memory.

Figure 6:
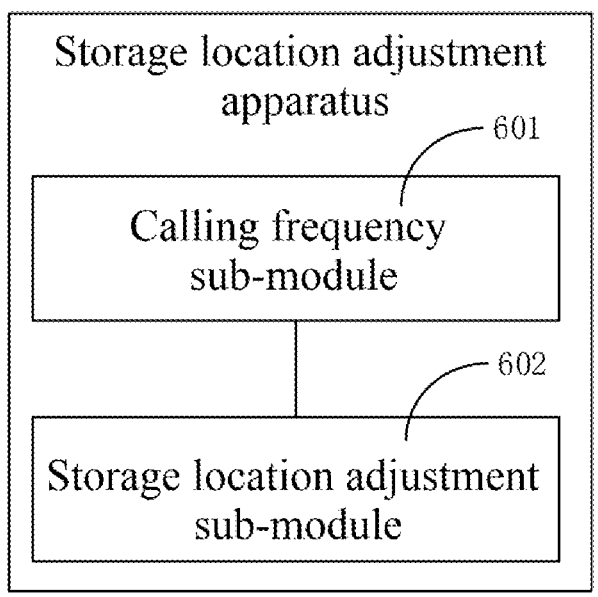
FIG. 6 is a structural diagram of a storage location adjustment apparatus according to an embodiment of the present disclosure.

As shown in FIG. 6, in an implementation, the apparatus further includes:
a frequency for calling sub-module 601 configured to determine frequency for calling of the target mapping file; and a storage location adjustment sub-module 602 configured to adjust a storage location of the target mapping file based on the frequency for calling of the target mapping file.

In an implementation, the error information of the target application is obtained from message-oriented middleware, and error information reported by a plurality of user terminals are stored in the message-oriented middleware.

In the technical solutions of the present disclosure, obtaining, storage, application, etc. of personal information of a user all comply with related laws and regulations and are not against the public order and good morals.

According to an embodiment of the present disclosure, the present disclosure further provides an electronic device, a readable storage medium, and a computer program product.

Figure 7:
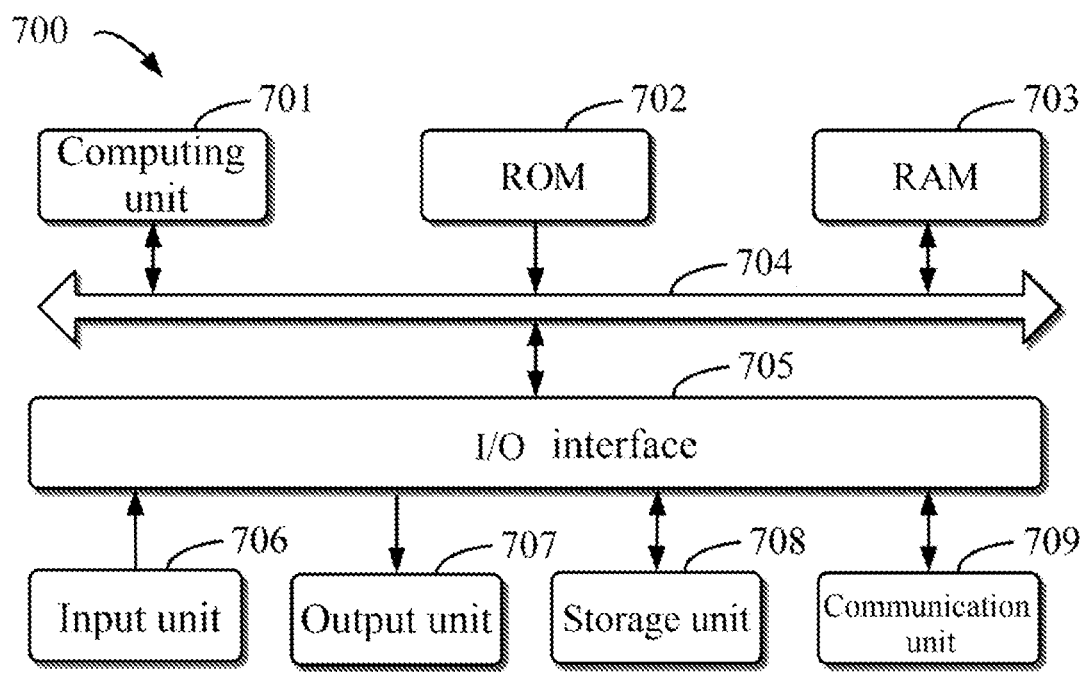
FIG. 7 is a block diagram of an electronic device for implementing a method for locating fault information according to an embodiment of the present disclosure.

FIG. 7 is a schematic block diagram of an example electronic device 700 that may be used to implement the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 7, the device 700 includes a computing unit 701, which may perform various appropriate actions and processing according to a computer program stored in a read-only memory (ROM) 702 or a computer program loaded from a storage unit 708 to a random access memory (RAM) 703. The RAM 703 may further store various programs and data required for the operation of the device 700. The computing unit 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, such as a keyboard or a mouse; an output unit 707, such as various types of displays or speakers; a storage unit 708, such as a magnetic disk or an optical disc; and a communication unit 709, such as a network interface card, a modem, or a wireless communication transceiver. The communication unit 709 allows the device 700 to exchange information/data with other devices through a computer network, such as the Internet, and/or various telecommunications networks.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 701 performs the various methods and processing described above, for example, the method for locating fault information. For example, in some embodiments, the method for locating fault information may be implemented as a computer software program, which is tangibly contained in a machine-readable medium, such as the storage unit 708. In some embodiments, a part or all of the computer program may be loaded and/or installed onto the device 700 via the ROM 702 and/or the communication unit 709. When the computer program is loaded onto the RAM 703 and executed by the computing unit 701, one or more steps of the method for locating fault information described above can be performed. Alternatively, in other embodiments, the computing unit 701 may be configured, by any other suitable means (for example, by means of firmware), to perform the method for locating fault information.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

The specific implementations above do not constitute a limitation on the protection scope of the present disclosure. Those skilled in the art should understand that various modifications, combinations, sub-combinations, and replacements can be made based on design requirements and other factors. Any modifications, equivalent replacements, improvements, etc. within the spirit and principle of the present disclosure shall fall within the protection scope of the present disclosure.

What is claimed is:

1. A method for locating fault information, the method comprising:
    parsing error information of a target application to obtain version information of the target application and an error attribute of the target application;
    determining, based on the version information, a target mapping file corresponding to the error information; and
    determining a target location by utilizing the error attribute and the target mapping file, wherein the target location is used to determine a location of a fault description content;
    wherein the error attribute comprises an error type and a reference error line number; and
    wherein the determining the target location by utilizing the error attribute and the target mapping file comprises:
        determining, in the target mapping file based on the error type, an index interval corresponding to the error information;
        determining, in the index interval based on a preset search strategy, mapping information corresponding to the reference error line number, wherein the mapping information comprises a correspondence between the reference error line number and an actual error line number; and
        determining the actual error line number of the fault description content by utilizing the reference error line number and the mapping information, and using the actual error line number as the target location.

2. The method according to claim 1, wherein the preset search strategy comprises a traversal search strategy or a binary search strategy.

3. The method according to claim 1, wherein the determining, based on the version information, the target mapping file corresponding to the error information comprises:
    determining the target mapping file in a local memory or a remote memory, based on the version information.

4. The method according to claim 3, wherein the determining the target mapping file in the local memory or the remote memory comprises:
    determining the local memory as having a first priority, and determining the target mapping file in the local memory.

5. The method according to claim 4, wherein the determining the target mapping file in the local memory or the remote memory further comprises:
    in response to determining that the target mapping file does not exist in the local memory, determining the target mapping file in the remote memory.

6. The method according to claim 5, further comprising:
    determining a frequency for calling the target mapping file; and
    adjusting a storage location of the target mapping file based on the frequency for calling the target mapping file.

7. The method according to claim 1, wherein the error information of the target application is obtained from a message-oriented middleware, in which the error information reported by a plurality of user terminals are stored.

8. An electronic device, comprising:
    one or more processors; and
    a memory storing one or more programs configured to be executed by the one or more processors, the one or more programs including instructions for causing the electronic device to perform operations comprising:
        parsing error information of a target application to obtain version information of the target application and an error attribute of the target application;
        determining, based on the version information, a target mapping file corresponding to the error information; and
        determining a target location by utilizing the error attribute and the target mapping file, wherein the target location is used to determine a location of fault description content;
    wherein, when the error attribute includes an error type and a reference error line number; and
    wherein the determining the target location by utilizing the error attribute and the target mapping file comprises:

determining, in the target mapping file based on the error type, an index interval corresponding to the error information;

determining, in the index interval based on a preset search strategy, mapping information corresponding to the reference error line number, wherein, the mapping information includes a correspondence between the reference error line number and an actual error line number; and determining the actual error line number of the fault description content by utilizing the reference error line number and the mapping information, and using the actual error line number as the target location.

9. The electronic device according to claim 8, wherein, the preset search strategy includes a traversal search strategy or a binary search strategy.

10. The electronic device according to claim 8, wherein, the determining, based on the version information, the target mapping file corresponding to the error information comprises:

determining the target mapping file in a local memory or a remote memory, based on the version information.

11. The electronic device according to claim 10, wherein, the determining the target mapping file in the local memory or the remote memory comprises:

determining the local memory as having a first priority; and determining the target mapping file in the local memory.

12. The electronic device according to claim 11, wherein, the determining the target mapping file in the local memory or the remote memory further comprises:

in response to determining that the target mapping file does not exist in the local memory, determining the target mapping file in the remote memory.

13. The electronic device according to claim 12, wherein the operations further comprise:

determining frequency for calling of the target mapping file; and adjusting a storage location of the target mapping file based on the frequency for calling of the target mapping file.

14. The electronic device according to claim 8, wherein the error information of the target application is obtained from message-oriented middleware, in which the error information reported by a plurality of user terminals are stored.

15. A non-transitory computer-readable storage medium storing one or more programs, the one or more programs comprising instructions that, when executed by one or more processors of an electronic device, cause the electronic device to perform operations comprising:

parsing error information of a target application to obtain version information of the target application and an error attribute of the target application;

determining, based on the version information, a target mapping file corresponding to the error information; and determining a target location by utilizing the error attribute and the target mapping file, wherein the target location is used to determine a location of fault description content;

wherein the error attribute comprises an error type and a reference error line number; and wherein the determining the target location by utilizing the error attribute and the target mapping file comprises:

determining, in the target mapping file based on the error type, an index interval corresponding to the error information;

determining, in the index interval based on a preset search strategy, mapping information corresponding to the reference error line number, wherein the mapping information comprises a correspondence between the reference error line number and an actual error line number; and determining the actual error line number of the fault description content by utilizing the reference error line number and the mapping information, and using the actual error line number as the target location.

* * * * *